United States Patent [19]

Whaley, Jr.

[11] Patent Number: 4,696,109
[45] Date of Patent: Sep. 29, 1987

[54] SATELLITE LOCATOR

[76] Inventor: John H. Whaley, Jr., 1019 E. 36th Pl., Tulsa, Okla. 74105

[21] Appl. No.: 783,459

[22] Filed: Oct. 3, 1985

[51] Int. Cl.$^4$ ............................................. G01C 21/02
[52] U.S. Cl. ..................................... 33/1 B; 33/1 SC
[58] Field of Search ................... 33/1 B, 1 SB, 1 SC, 33/1 SD

[56] References Cited

U.S. PATENT DOCUMENTS

| | | | |
|---|---|---|---|
| 2,495,211 | 1/1950 | Curtis | 33/1 SD |
| 2,561,794 | 7/1951 | Gurney | 33/1 SD |
| 2,916,207 | 12/1959 | Vohland | 33/1 SD |
| 3,535,790 | 10/1970 | Gray et al. | 33/1 SC |

FOREIGN PATENT DOCUMENTS 454654  10/1936  United Kingdom .............. 33/1 SD

Primary Examiner—Richard R. Stearns

[57] ABSTRACT

The sighting angles to above horizon points in the geostationary satellite orbit around the earth are determined from any known location on the earth with this device.

1 Claim, 1 Drawing Figure

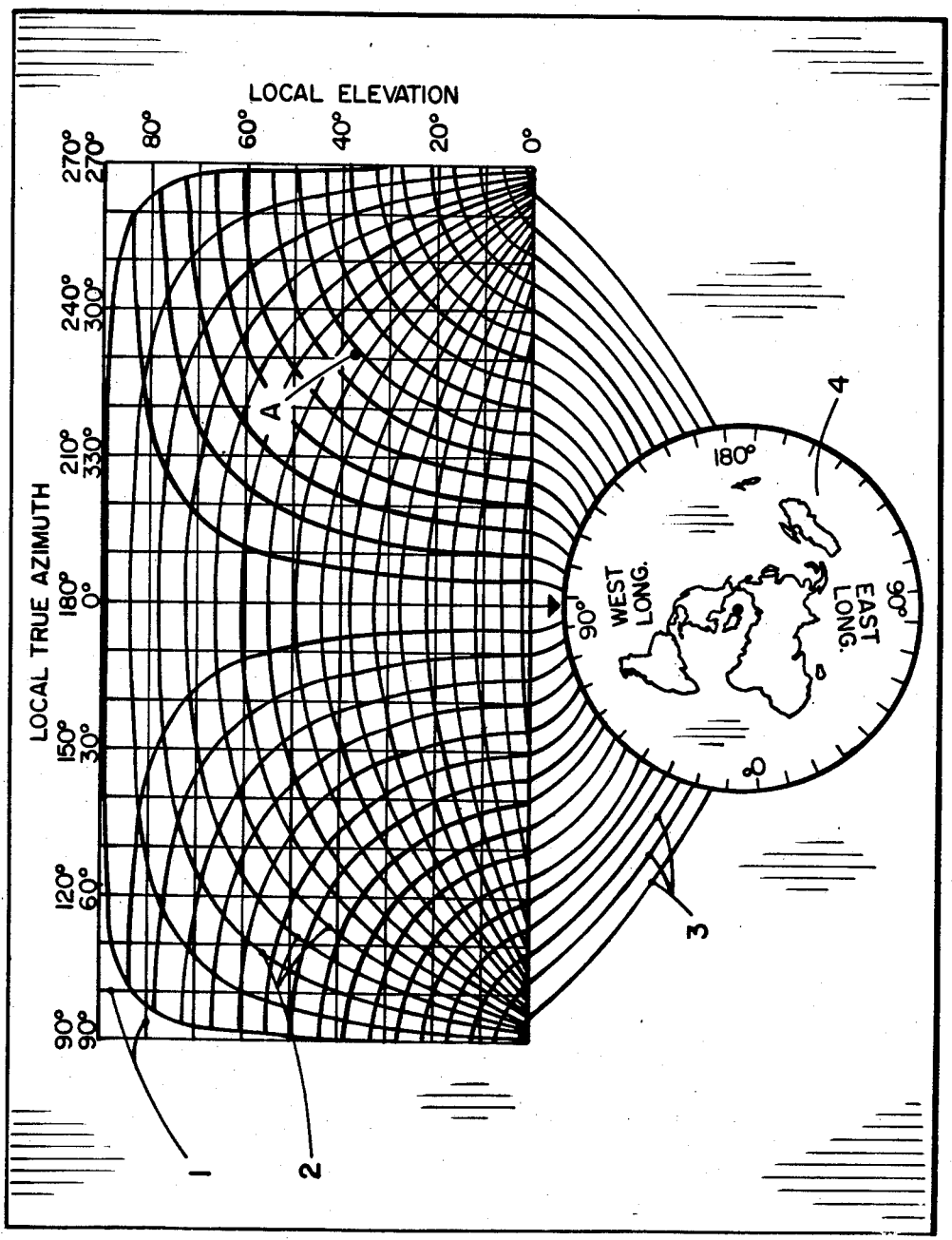

SATELLITE LOCATOR

BACKGROUND OF THE INVENTION

When a site is evaluated for placement of a satellite earth station, the primary consideration is line of sight clearance to the intended orbital satellite locations. The present methods of determining the sighting angles to points in the geostationary orbit such as small electronic calculators or pre-calculated tables give simply a set of numbers representing azimuth and elevation to the satellite orbit location. These angles must then be mentally interpreted and measured to make sure the satellite locations are not blocked from view by local obstructions such as trees and buildings. The Present invention can do this as a hand-held, hand operated device that shows not only the angles to a particular orbit point but the entire orbit path from horizon to horizon in a graphic form. This graphic form is an excellent visual aid to help identify parts of the orbit that may be blocked from sight by local objects such as trees and buildings. This visual aid aspect of the invention is also excellent for familiarizing persons new to satellite technology with the concept of orbital location.

SUMMARY OF THE INVENTION

The present invention consists of a plane sheet of suitable material upon which is imprinted: a. a mercator projection of an earth true azimuth verses elevation grid with b. superimposed curves that describe the corresponding geostationary orbital points from various latitudes on the earth and c. curves from equal orbital longitude points that extend from this composite graph to d. an attached rotatable dial which can be imprinted with a polar projection of the earth and is imprinted with east and west longitude markings which give values to the satellite orbital longitude curves as well as the longitude of the site from which the sighting angles are desired.

BRIEF DESCRIPTION OF THE DRAWING

FIG. 1 is a plan view of the satellite locator showing the main body graph with the superimposed curves and the attached rotateable dial.

DETAILED DESCRIPTION OF THE INVENTION

FIG. 1 illustrates the form of the present invention for calculating the above horizon elevation and azimuth angles to points in the geostationary earth orbit. Indicated by 1 is the main body graph consisting of a mercator projection of earth true azimuth versus elevation lines respectively marked in the horizontal and vertical direction. The numbers 90 through 270 degrees, in steps of 10, are labeled "LOCAL TRUE AZIMUTH" along with coinciding smaller number 90 through 270 degrees, also in steps of 10, labeled as "SOUTHERN HEMISPHERE". In the vertical direction it is marked 0 through 90 degrees, in steps of 10, and these numbers are labeled "LOCAL ELEVATION". Indicated by 2 is the set of curves which plot corresponding geostationary orbital positions as seen from selected latitudes labeled as 1, 5, and 10 through 80 degrees, in steps of 5, labeled "LOCAL LATITUDE LINES". The vertical set of curves indicated by 3 which extend from equal orbital longitude points down to the dial 4 are not labeled. The rotatable dial 4 is marked wtih numbers from 0 to 180 degrees, in steps of five, for both east and west longitudes. These are labeled "EAST LONGITUDE", and "WEST LONGITUDE".

An example of the use of the invention will calculate the azimuth and elevation angles to the satellite in the geostationary orbital position 131 degrees west longitude from Dallas, Texas.

The earth dial is rotated to position the longitude of Dallas (96.8 West) at the arrow pointing down from the middle of the main graph.

Next the arc cooresponding to the latitude of Dallas (32.8) is located from the series of curves indicated as "LOCAL LATITUDE". Thus the proper curve would be the imaginary curve 2.8 degrees below the curve marked 30 degrees.

Next the proper upward going longitude curve at which the satellite is positioned (131 West) is located at the dial. In this example it would again be an imaginary curve starting at the dial from the position of 131 degrees West longitude and extending upward to the imaginary local latitude curve located in the previous step.

This point where the two imaginary curves coincide is labeled as point (A) in FIG. 1. The azimuth and elevation values of this point are now read from the main horizontal/vertical graph labeled "LOCAL TRUE AZIMUTH" and "LOCAL ELEVATION" as azimuth=231 degrees elevation=37 degrees. Another example of use would be to then calculate the full visible arc from this location in Dallas.

With the dial still positioned as above (96.8 West under the arrow), follow the horizontal latitude curve of 32.8 degrees to the right and left and it is seen that the orbital arc reaches the horizon (0 degrees elevation) at about 96 degrees in the east and about 264 degrees in the west. If we then follow the vertical longitude curves from these points back to the dial we can see that the geostationary orbital arc visible from this location is from 17 degrees west longitude to 175 degrees west longitude.

What is claimed is:

1. An apparatus for determining the azimuth and elevation angles from a known location on the surface of the earth to points in geostationary earth orbit comprising:

a sheet of suitable material imprinted with a mercator projection grid of true azimuth versus elevation lines with superimposed curves corresponding to geostationary orbital points as calculated from various earth latitudes and superimposed curves corresponding to equal orbital longitude points with an attached rotatable circular dial with markings representing earth longitudes which is appropriately placed to coincide with the equal orbital longitude curves which extend from said mercator projection grid to the periphery of said circular dial.

* * * * *